(12) United States Patent
Dry et al.

(10) Patent No.: US 9,187,019 B2
(45) Date of Patent: Nov. 17, 2015

(54) THIGH SUPPORT FOR CUSTOMER ACCOMMODATION SEAT

(71) Applicant: Ford Global Technologies, LLC, Dearborn, MI (US)

(72) Inventors: Alan George Dry, Grosse Pointe Woods, MI (US); Gunnar Groesbeck, Berkley, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/056,000

(22) Filed: Oct. 17, 2013

(65) Prior Publication Data

US 2015/0108816 A1    Apr. 23, 2015

(51) Int. Cl.
*B60N 2/62* (2006.01)
(52) U.S. Cl.
CPC ..................... *B60N 2/62* (2013.01)
(58) Field of Classification Search
CPC ....................................... B60N 2/62
USPC ............................ 297/284.11, 312
See application file for complete search history.

(56) References Cited

U.S. PATENT DOCUMENTS

| | | | |
|---|---|---|---|
| 2,958,369 A | 11/1960 | Pitts et al. | |
| 3,403,938 A | 10/1968 | Cramer et al. | |
| 3,550,953 A * | 12/1970 | Neale | 297/312 |
| 3,632,166 A * | 1/1972 | Lohr | 297/284.1 |
| 3,883,173 A * | 5/1975 | Shephard et al. | 297/312 |
| 3,929,374 A | 12/1975 | Hogan et al. | |
| 4,018,477 A * | 4/1977 | Hogan | 297/284.11 |
| 4,324,431 A | 4/1982 | Murphy et al. | |
| 4,334,709 A | 6/1982 | Akiyama et al. | |
| 4,353,595 A | 10/1982 | Kaneko et al. | |
| 4,541,669 A * | 9/1985 | Goldner | 297/284.11 |
| 4,583,781 A * | 4/1986 | Hatsutta et al. | 297/284.11 |
| 4,629,248 A | 12/1986 | Mawbey | |
| 4,720,141 A | 1/1988 | Sakamoto et al. | |
| 4,753,479 A | 6/1988 | Hatsutta et al. | |
| 4,915,447 A * | 4/1990 | Shovar | 297/284.11 |
| 5,171,062 A | 12/1992 | Courtois | |

(Continued)

FOREIGN PATENT DOCUMENTS

| | | |
|---|---|---|
| DE | 3139945 A1 | 4/1983 |
| DE | 3841688 A1 | 6/1990 |

(Continued)

OTHER PUBLICATIONS

"SEATS," http://www.bavarianmw.com/guide-4400.html, www.bmwmanuals.org, 2012 (5 pages).

(Continued)

*Primary Examiner* — Peter Brown
(74) *Attorney, Agent, or Firm* — Vinchit Chea; Price Heneveld LLP (57) ABSTRACT

A vehicle seating assembly includes a seatback. A seat base includes a first thigh support and a second thigh support. A self-locking cam system is operably coupled with the first thigh support and the second thigh support, including a torque tube. A plurality of cams are disposed along the torque tube and are operably coupled with a plurality of spring guides. The self-locking cam system is configured to move the first thigh support and the second thigh support from a lowered position to a raised position.

17 Claims, 8 Drawing Sheets

(56) References Cited

U.S. PATENT DOCUMENTS

| | | | |
|---|---|---|---|
| 5,174,526 A | 12/1992 | Kanigowski | |
| 5,380,063 A * | 1/1995 | Dauphin | 297/284.11 |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,055,904 B2 * | 6/2006 | Skelly et al. | 297/284.9 |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,342,607 B2 | 1/2013 | Hofmann et al. | |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0322124 A1 | 12/2009 | Barkow et al. | |
| 2010/0038937 A1 | 2/2010 | Andersson et al. | |
| 2010/0140986 A1 | 6/2010 | Sawada | |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |
| 2010/0231013 A1 | 9/2010 | Schlenker | |
| 2010/0270840 A1 | 10/2010 | Tanaka et al. | |
| 2010/0301650 A1 | 12/2010 | Hong | |
| 2010/0320816 A1 | 12/2010 | Michalak | |
| 2011/0018498 A1 | 1/2011 | Soar | |
| 2011/0074185 A1 | 3/2011 | Nakaya et al. | |
| 2011/0095513 A1 | 4/2011 | Tracht et al. | |
| 2011/0095578 A1 | 4/2011 | Festag | |
| 2011/0109127 A1 | 5/2011 | Park et al. | |
| 2011/0109128 A1 | 5/2011 | Axakov et al. | |
| 2011/0121624 A1 | 5/2011 | Brncick et al. | |
| 2011/0133525 A1 | 6/2011 | Oota | |
| 2011/0163574 A1 | 7/2011 | Tame et al. | |
| 2011/0163583 A1 | 7/2011 | Zhong et al. | |
| 2011/0186560 A1 | 8/2011 | Kennedy et al. | |
| 2011/0187174 A1 | 8/2011 | Tscherbner | |
| 2011/0215200 A1 | 9/2011 | Mejuhas | |
| 2011/0254335 A1 | 10/2011 | Pradier et al. | |
| 2011/0260506 A1 | 10/2011 | Kuno | |
| 2011/0272548 A1 | 11/2011 | Rudkowski et al. | |
| 2011/0272978 A1 | 11/2011 | Nitsuma | |
| 2011/0278885 A1 | 11/2011 | Procter et al. | |
| 2011/0278886 A1 | 11/2011 | Nitsuma | |

(56) References Cited

U.S. PATENT DOCUMENTS

| | | |
|---|---|---|
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |

FOREIGN PATENT DOCUMENTS

| | | |
|---|---|---|
| EP | 0754590 | 1/1997 |
| EP | 0926969 | 1/2002 |
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| FR | 2562003 A1 | 10/1985 |
| JP | 05115331 A | 5/1993 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.COM, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

THIGH SUPPORT FOR CUSTOMER ACCOMMODATION SEAT

FIELD OF THE INVENTION

The present invention generally relates to a vehicle seating assembly, and more particularly to a vehicle seating assembly having a manually adjustable thigh support for providing comfort to a vehicle passenger.

BACKGROUND OF THE INVENTION

Vehicles that include improved thigh support technology increase comfort and value to the consumer.

SUMMARY OF THE INVENTION

According to one aspect of the present invention, a vehicle seating assembly includes a seatback. A seat base includes a first thigh support and a second thigh support. A self-locking cam system is operably coupled with the first thigh support and the second thigh support, including a torque tube. A plurality of cams are disposed along the torque tube and are operably coupled with a plurality of spring guides. The self-locking cam system is configured to move the first thigh support and the second thigh support from a lowered position to a raised position.

According to another aspect of the present invention, a vehicle seating assembly includes a seat base having first and second thigh supports that are independently movable. A cam system is operably coupled with the first and second thigh supports and include a torque tube. A plurality of cams are disposed along the torque tube. An actuation lever is operably coupled with the cam system and is configured to move the first and second thigh supports from a lowered position to a raised position.

According to yet another aspect of the present invention, a vehicle seating assembly includes a seat base having first and second thigh supports. First and second cam subassemblies are operably coupled with the first and second thigh supports and include a torque tube. A plurality of cams are spaced apart along the torque tube. The first and second cam subassemblies are configured to move the first and second thigh supports from a lowered position to a raised position using an actuation lever.

These and other aspects, objects, and features of the present invention will be understood and appreciated by those skilled in the art upon studying the following specification, claims, and appended drawings.

DETAILED DESCRIPTION OF EMBODIMENTS

Figure 1:
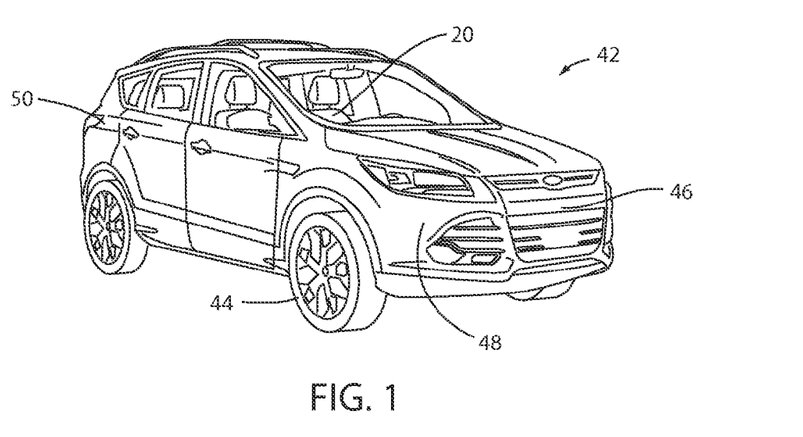
FIG. 1 is a front perspective view of a vehicle having a vehicle seat according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-10B, reference numeral 20 generally designates a vehicle seating assembly including a seatback 22 and a seat base 24, which includes a first thigh support 26 and a second thigh support 28. The vehicle seating assembly 20 also includes a self-locking cam system 30 operably coupled with the first thigh support 26 and the second thigh support 28 including a torque tube 32 and a plurality of cams 34 disposed along the torque tube 32 and operably coupled with a plurality of spring guides 36. Moreover, the self-locking cam system 30 is configured to move the first thigh support 26 and the second thigh support 28 from a lowered position 38 to a raised position 40.

Figure 2:
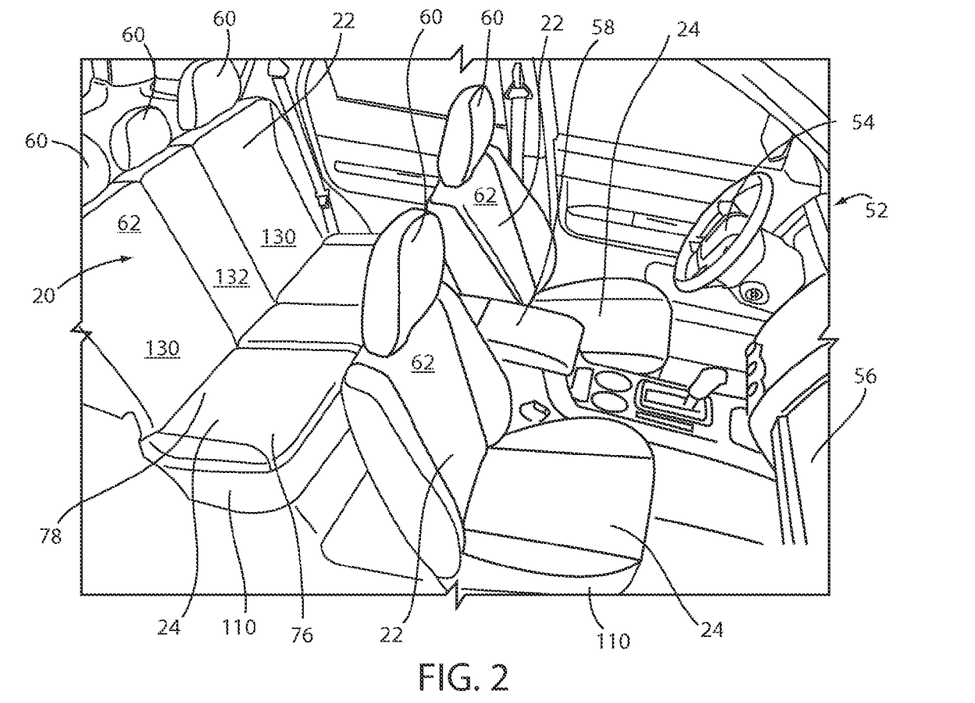
FIG. 2 is a top perspective view of an interior of the vehicle having the vehicle seating assembly of FIG. 1.

Referring again to FIG. 1, a vehicle 42 includes the vehicle seating assembly 20 and also includes other features, such as multiple wheels 44, a bumper 46, a front end 48, and a rear end 50. The vehicle 42 may be of any type, including a compact vehicle, a mid-size vehicle, a sport utility vehicle, a mini or full size van, or any type of truck. As illustrated in the embodiment of FIG. 2, an interior 52 of the vehicle 42 may include multiple vehicle seating assemblies 20. The vehicle seating assembly 20 of the present invention may be a front passenger vehicle seat, a rear passenger vehicle seat, or a driver's vehicle seat. The interior 52 of the vehicle 42 may also include other features, such as a steering wheel 54, a dashboard 56, a center console 58 for extra storage, etc. Moreover, the interior 52 of the vehicle 42 may include multiple vehicle seating assemblies 20 such that all of the rear passenger seat, the front passenger seat, and the front driver's seat may be produced according to the present invention. However, it is also contemplated that the vehicle interior 52 may only include a single vehicle seating assembly 20 that includes the self-locking cam 30.

Figure 3:
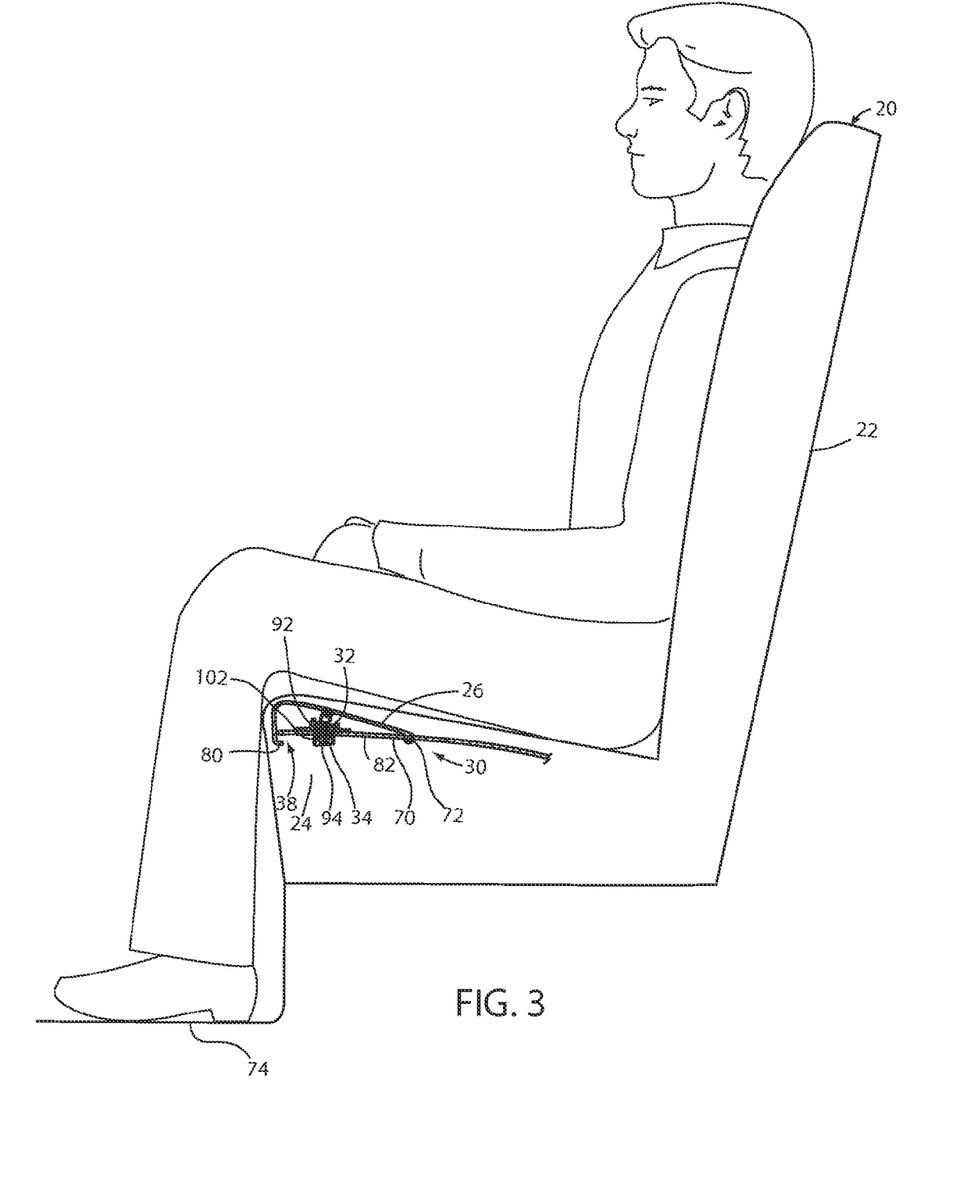
FIG. 3 is a side partial cross-sectional view of the vehicle seat having a self-locking cam system in a lowered position.
Figure 4:
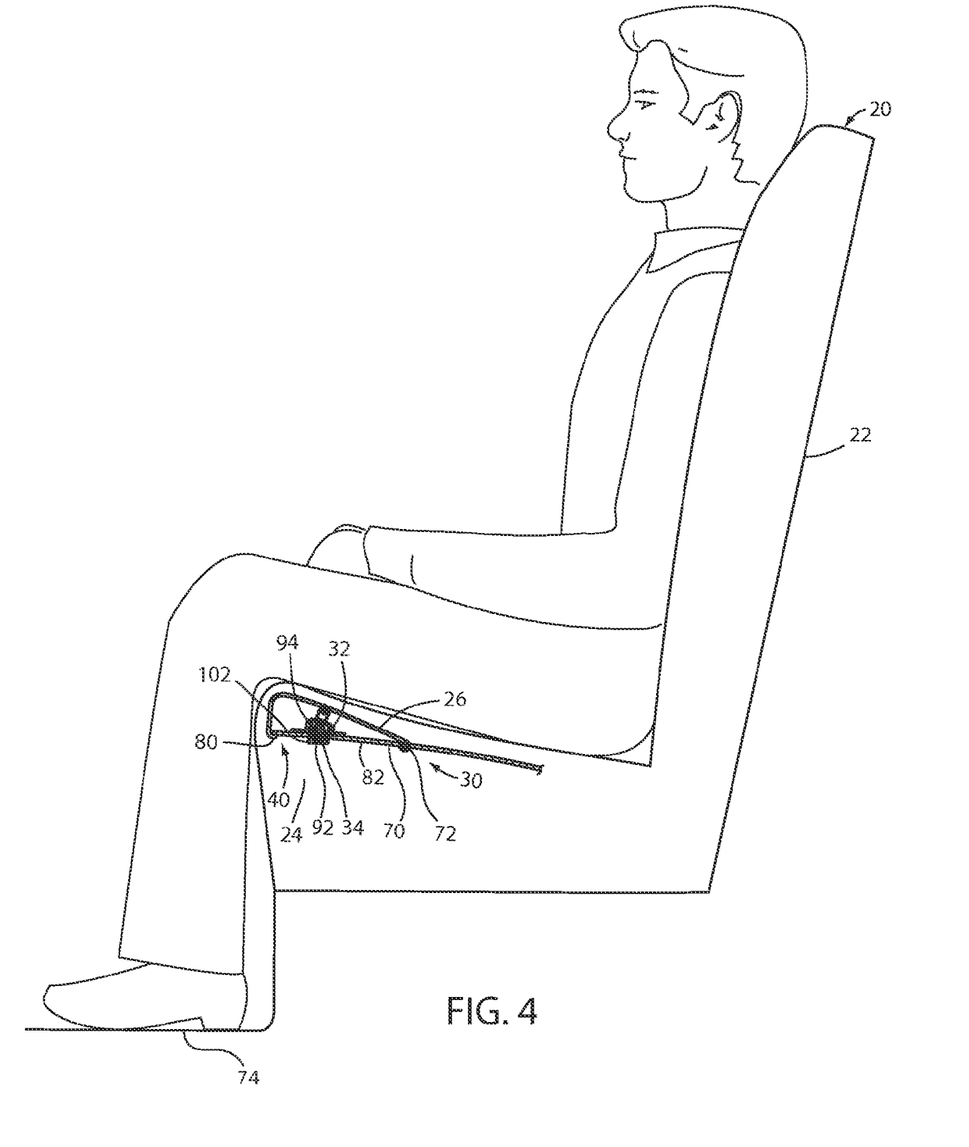
FIG. 4 is a side partial cross-sectional view of the vehicle seat having a self-locking cam system in a raised position.

Referring now to the embodiments shown in FIGS. 3 and 4, the vehicle seating assembly 20 includes the seat base 24 and the seatback 22. The vehicle seating assembly 20 may also include a headrest 60 and a coverstock 62. The coverstock 62 is generally disposed over the seatback 22 and the seat base 24. Moreover, the coverstock 62 is configured to provide a uniform look and feel to the vehicle seating assembly 20. Additionally, the coverstock 62 forms a passenger engagement surface on both the seatback 22 and the seat base 24 of the vehicle seating assembly 20. Moreover, the vehicle seating assembly 20, and more specifically, the seat base 24 of the vehicle seating assembly 20 may include the self-locking cam system 30.

Referring again to the embodiments shown in FIGS. 3 and 4, the self-locking cam system 30 is disposed inside of the seat base 24. Specifically, the self-locking cam system 30 is disposed below a normal compression depth penetrated by the body of a vehicle passenger during normal use. This allows the vehicle passenger to be unaware that the self-locking cam system 30 is disposed below them. The self-locking cam system 30 is generally a spring-biased, self-locking cam system. The self-locking cam system 30 includes the first thigh support 26 and a bottom portion 70, which are operably coupled by using a hinge pin 72. However, it is also contemplated that the first thigh support 26 and the bottom portion 70 may be operably coupled by a spring, or other pin, as known by one of ordinary skill in the art. The hinge pin 72 may be made of a molded plastic polymer material. However, it is also contemplated that the hinge pin 72 may be made of steel or other strong material as known by one of ordinary skill in the art. The first thigh support 26 may be made of a plastic polymer material. However, it is also contemplated that the first thigh support 26 may be made of a medium carbon steel or other material that has the necessary strength to support the vehicle passenger. The bottom portion 70 is a linear flat portion parallel with a floor 74 of the vehicle interior 52. The first thigh support 26 is angled and forms a V-shaped connection with the bottom portion 70 of the self-locking cam system 30. More specifically, the first thigh support 26 begins at the hinge pin 72 and extends at approximately a 45 degree angle toward a front portion 76 of the seat base 24. The first thigh support 26 then extends vertically downward until the first thigh support 26 is below the bottom portion 70 of the self-locking cam system 30. The first thigh support portion 26 then extends a small amount back toward a rear portion 78 of the seat base 24, forming a hook 80.

As shown in the embodiment illustrated in FIG. 3, when the first thigh support 26 is in the lowered position 38, the hook 80 is disposed below the bottom portion 70 of the self-locking cam system 30. However, as illustrated in FIG. 4, when the first thigh support 26 is in the raised position 40, the hook 80 of the first thigh support 26 comes in abutting contact with a bottom surface 82 of the bottom portion 70, thus preventing further upward movement of the first thigh support 26.

Referring again to the embodiment shown in FIGS. 3 and 4, when the first thigh support 26 is in the lowered position 38, the front portion 76 of the seat base 24 does not come into contact with the lower thighs of the vehicle passenger. However, as shown in the embodiment illustrated in FIG. 4, when the first thigh support 26 is in the raised position 40, the seat base 24 comes into contact with the lowered thighs of the vehicle passenger, providing additional comfort and support to the vehicle passenger. It is contemplated that a single vehicle seating assembly 20 may include more than one thigh support, and specifically, the first thigh support 26 and the second thigh support 28 corresponding with each leg of the vehicle passenger. However, it is also contemplated that the first thigh support portion 26 may be capable of providing support for both legs of the vehicle passenger.

Referring yet again to the embodiments illustrated in FIGS. 3 and 4, the self-locking cam system 30 also includes at least one cam 34. The cam 34 is oval-shaped and includes a pass-through aperture 90. The aperture 90 is generally disposed on a bottom end 92 of the cam 34 and is configured to receive the torque tube 32. As shown in the embodiment illustrated in FIGS. 3 and 4, the cam 34 may be egg-shaped having a thinner top end 94 and the thicker bottom end 92. The torque tube 32 is operably coupled with an actuation lever 96 and includes multiple cams 34 spaced apart along the torque tube 32. Additionally, the torque tube 32 has friction pivots such that when the actuation lever 96 is moved, the torque tube 32 is moved, and in turn, moves or rotates the cam 34. The torque tube 32 is secured to the bottom portion 70 of the self-locking cam system 30 using pillow blocks 98. However, it is also contemplated that the torque tube 32 is secured by another method as known by one of ordinary skill in the art. The pillow blocks 98 are attached to the bottom portion 70 of the self-locking cam system 30 using heat stakes, screws, or other fixing means as known by one of ordinary skill in the art. Moreover, the cam 34 is configured to move from a low position 99 to a high position 100. The cam 34 is in the low position 99 when the top end 94 of the cam 34 is facing vertically downward. The cam 34 is in the high position 100 when the top end 94 is disposed in abutting contact with a top wall 103 of a cam follower 102.

Figure 5:
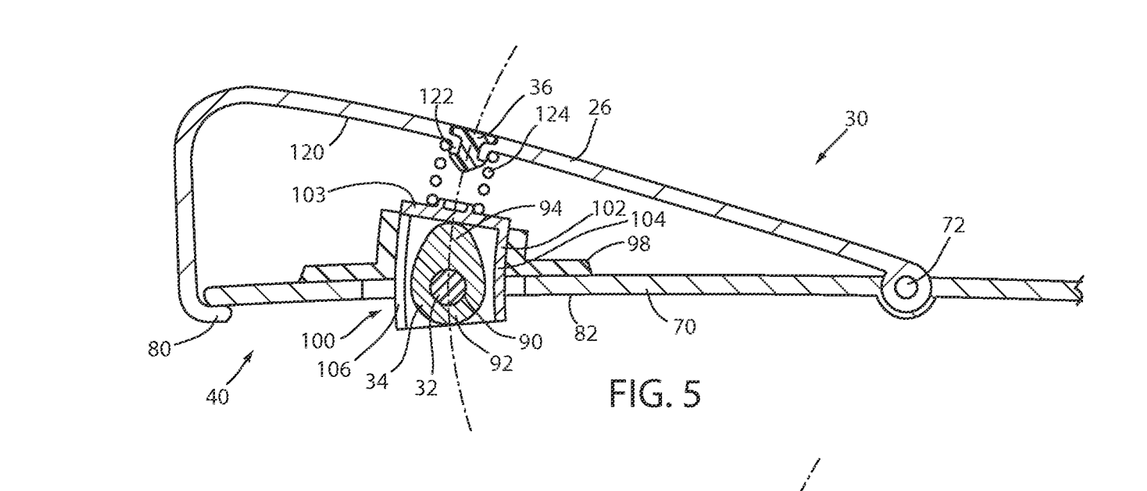
FIG. 5 is an enlarged cross-sectional view of the vehicle seat having a self-locking cam system in a raised position.
Figure 6:
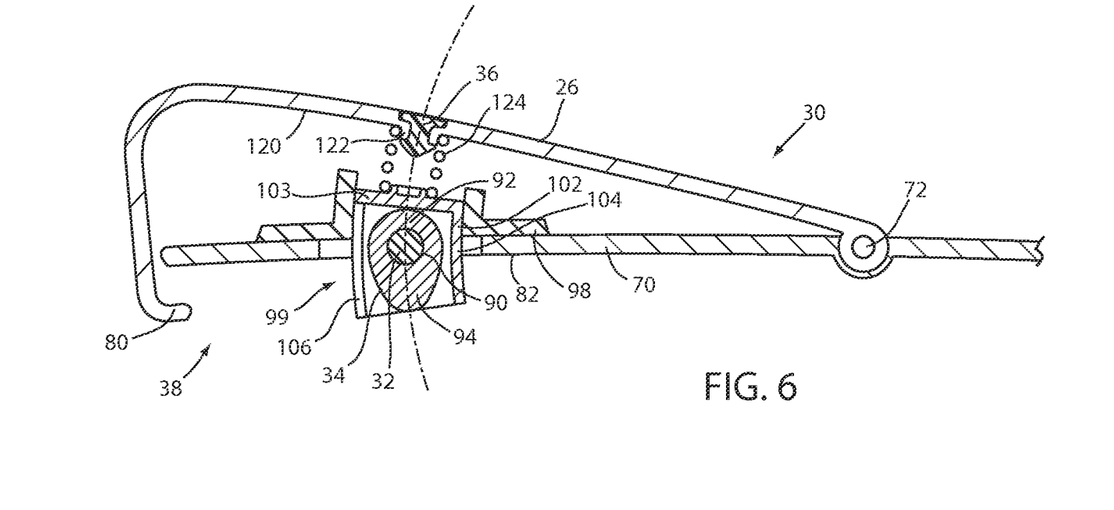
FIG. 6 is an enlarged cross-sectional view of the vehicle seat having a self-locking cam system in a lowered position.
Figure 7:
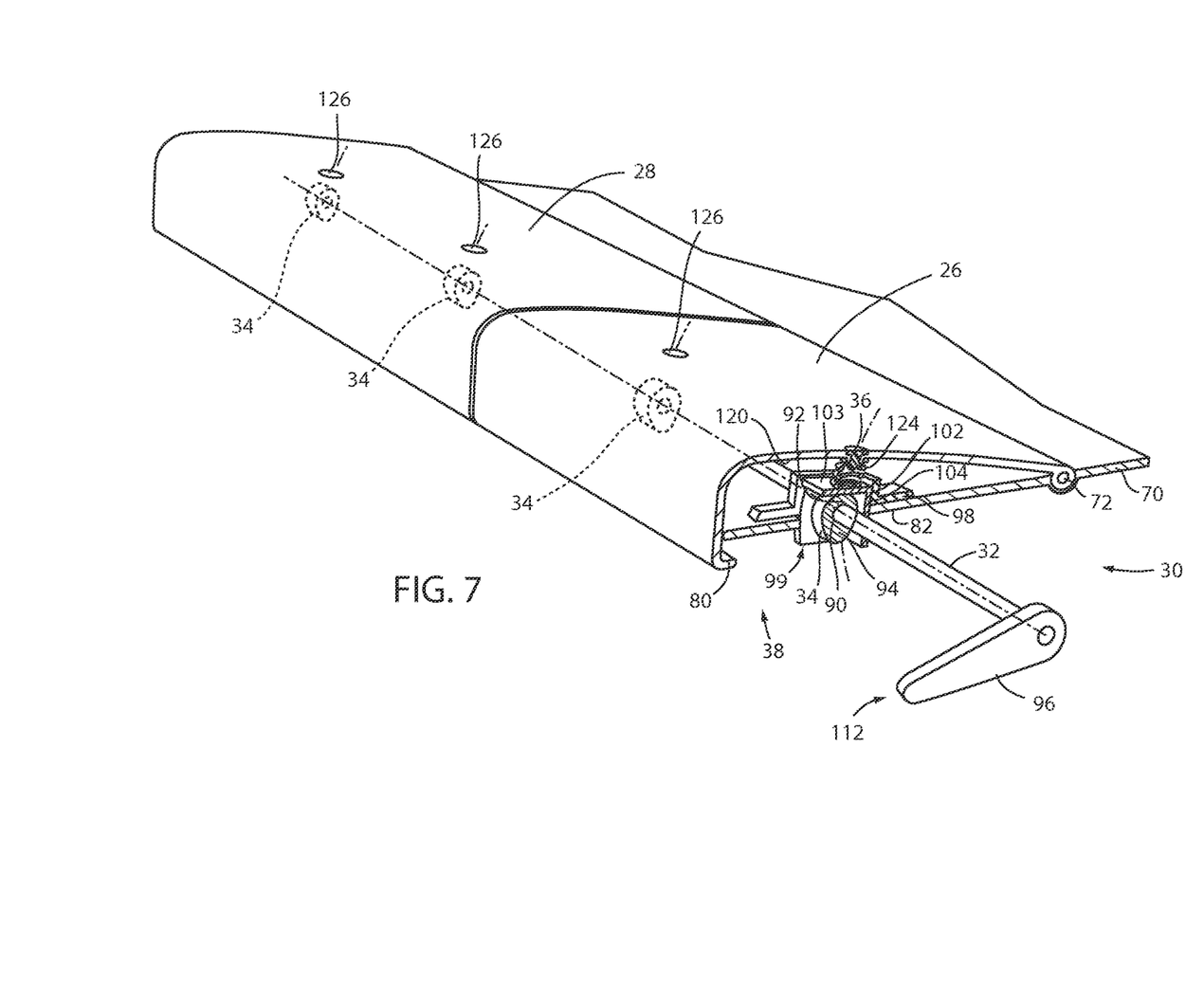
FIG. 7 is a top perspective view of the self-locking cam system in a lowered position.

Referring now to the embodiments shown in FIGS. 5-7, the cam follower 102 surrounds the cam 34. The cam follower 102 may be made of a medium carbon steel and overmolded onto the torque tube 32. However, it is also contemplated that the cam follower 102 may be made of a plastic polymer or other material as known by one of ordinary skill in the art. Additionally, it is also contemplated that the cam follower 102 may be operably coupled to the torque tube 32 in another way as known by one of ordinary skill in the art. The cam follower 102 includes the top wall 103 disposed above the cam 34, and a sidewall 104 disposed toward the rear portion 78 of the seat base 24 from the cam 34. In the embodiment shown in FIG. 5, the cam follower 102 does not include an opposite sidewall 106 and has an open construction. The open construction of the cam follower 102 allows the cam 34 to rotate freely without obstruction. However, it is also contemplated that the cam follower 102 may include an opposite sidewall 106 that may include a hole, an indented portion, or a breakaway portion, or any other construction as known by one of ordinary skill in the art to allow the cam 34 to rotate freely.

Referring now to the embodiments shown in FIGS. 5-8, the actuation lever 96 is a simple flat lever and is positioned on an outboard side 110 of the seat base 24. However, it is also contemplated that the actuation lever 96 may be disposed on either or both sides of the seat base 24 as known by one of ordinary skill in the art. Moreover, the actuation lever 96 is configured to rotate 180 degrees from a down position 112 to an up position 114. The 180 degree rotation of the actuation lever 96 rotates the torque tube 32 180 degrees, which drives the cam 34 from the low position 99 to the high position 100, which in turn moves the first thigh support 26 from the lowered position 38 to the raised position 40.

Referring again to the embodiments shown in FIGS. 5-7, a bottom surface 120 of the first thigh support 26 includes a spring guide boss 122. The spring guide boss 122 may be made of a molded plastic polymer material. However, it is also contemplated that the spring guide boss 122 may be made of steel or other materials as known by one of ordinary skill in the art. The spring guide boss 122 is cylindrical and has a spring 124 and the spring guide 36 disposed inside of the spring guide boss 122. The spring guide 36 is disposed within the spring guide boss 122 and the spring 124 is disposed around the spring guide 36. The spring 124 is a helical spring. However, the spring 124 may be another type of spring as known by one of ordinary skill in the art. When the actuation lever 96 is in the down position 112, the spring 124 is in abutting contact with the top wall 103 of the cam follower 102. Moreover, when the actuation lever 96 is in the down position 112, the spring 124 provides approximately 5-15 millimeters of spring variation to the first thigh support 26, and specifically approximately 10 millimeters. When the actuation lever 96 is in the up position 114, the cam 34 rotates and moves the top wall 103 of the cam follower 102. It is also contemplated that the top wall 103 of the cam follower 102 may include cam slot openings 126 such that the cam 34 moves into the cam slot openings 126 and comes into direct abutting contact with the spring 124. The spring 124 resets and then provides the additional approximately 10 millimeters of spring variations. The raised position 40 of the cam 34 allows the first thigh support 26 to be raised an additional approximately 10-20 millimeters, and specifically approximately 15 millimeters. Therefore, the self-locking cam system 30 of the present invention is configured to raise the first thigh support 26 approximately 15-35 millimeters, and specifically approximately 25 millimeters.

Figure 8:
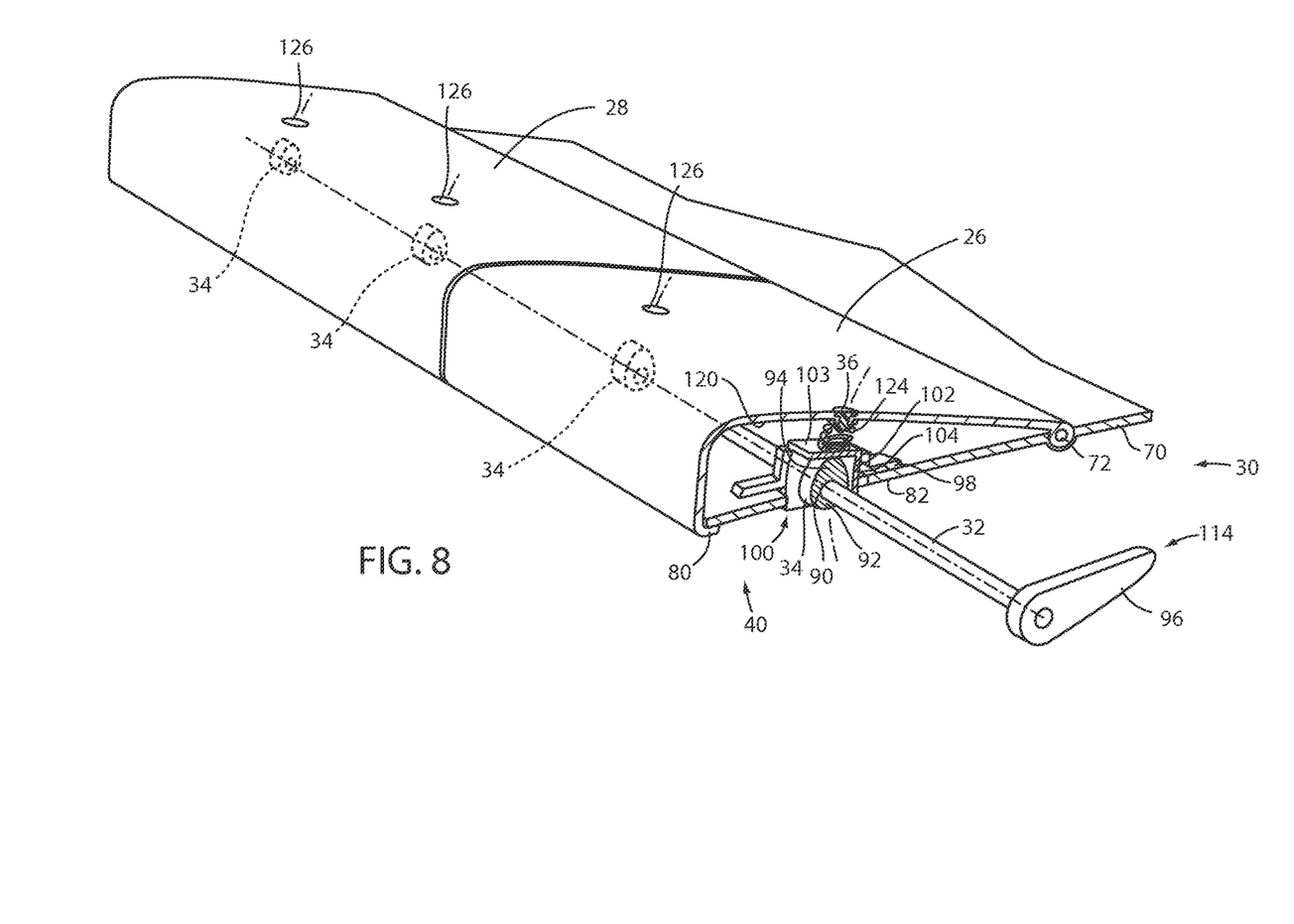
FIG. 8 is top perspective view of the self-locking cam system in a raised position.

Referring again to the embodiment shown in FIG. 8, multiple cams 34 may be disposed on the single torque tube 32. As illustrated in FIG. 8, the torque tube 32 includes four cams 34. However, it is also contemplated that there may be more or less cams 34 as known by one of ordinary skill in the art. Additionally, as shown in FIG. 8, a single seat base 24 may include the first and second thigh supports 26, 28 such that both the right and left thigh support may be configured to move independently of one another. In this embodiment, multiple actuation levers 96 are included and allow the vehicle passenger to move either the first thigh support 26 or the second thigh support 28 into the raised position 40.

Referring again to the embodiments shown in FIGS. 5-8, in operation, the actuation lever 96 begins in the down position 112 corresponding with the cam 34 being in the low position 99 and the first thigh support 26 being in the lowered position 38. When the actuation lever 96 is moved from the down position 112 to the up position 114, the torque tube 32 is rotated, which in turn rotates the plurality of cams 34. When the torque tube 32 rotates in accordance with the actuation lever 96, the cam 34 rotates from the low position 99 to the high position 100. Moving the cam 34 from the low position 99 to the high position 100 forces the top wall 103 of the cam follower 102 to be moved upward. The top wall 103 of the cam follower 102 is in abutting contact with the spring 124, which includes the spring guide boss 122, the spring guide 36, and the spring 124. The top wall 103 of the cam follower 102 forces the spring 124 and the spring guide boss 122 upward which rotates the first thigh support 26 about the hinge pin 72 to the raised position 40. In the raised position 40, the first thigh support 26 is configured to raise the seat base 24 to be in abutting contact with the lower thighs of the vehicle passenger, thereby providing additional support and comfort to the vehicle passenger. It is also contemplated that the self-locking cam system 30 may include the first and second thigh supports 26, 28, and that each of the first and second thigh supports 26, 28 includes separate actuation levers 96 and torque tube 32 such that the first and second thigh supports 26, 28 can move independently of each other.

Figure 9A:
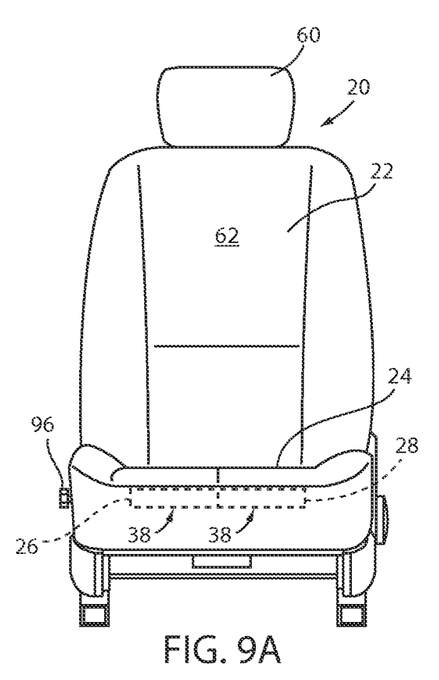
FIG. 9A is a front plan view of the vehicle seating assembly having the self-locking cam system in a lowered position.
Figure 9B:
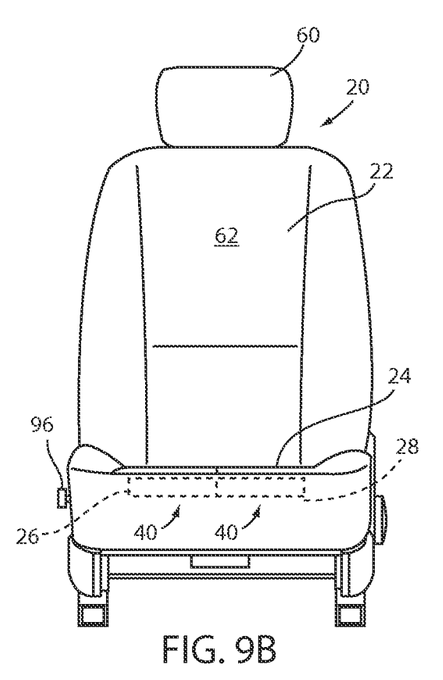
FIG. 9B is a front plan view of the vehicle seating assembly having the self-locking cam system in a raised position.
Figure 9C:
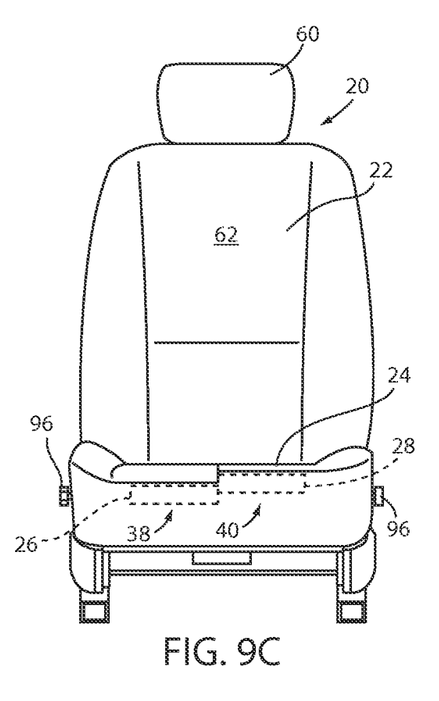
FIG. 9C is a front plan view of the vehicle seating assembly having the self-locking cam system with a first portion raised.
Figure 9D:
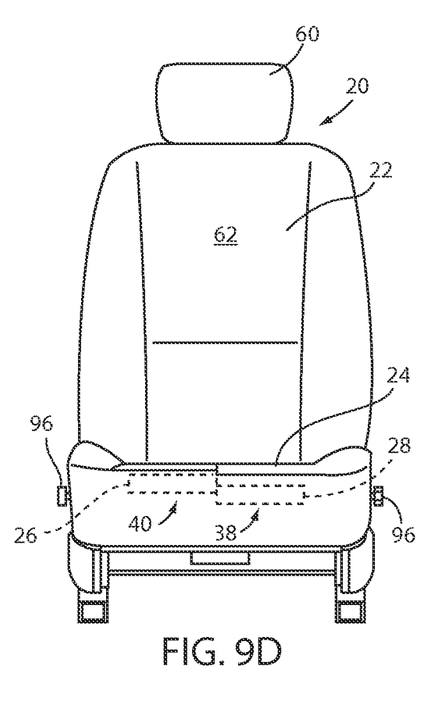
FIG. 9D is a front plan view of the vehicle seating assembly having the self-locking cam system with a second portion raised.
Figure 10A:
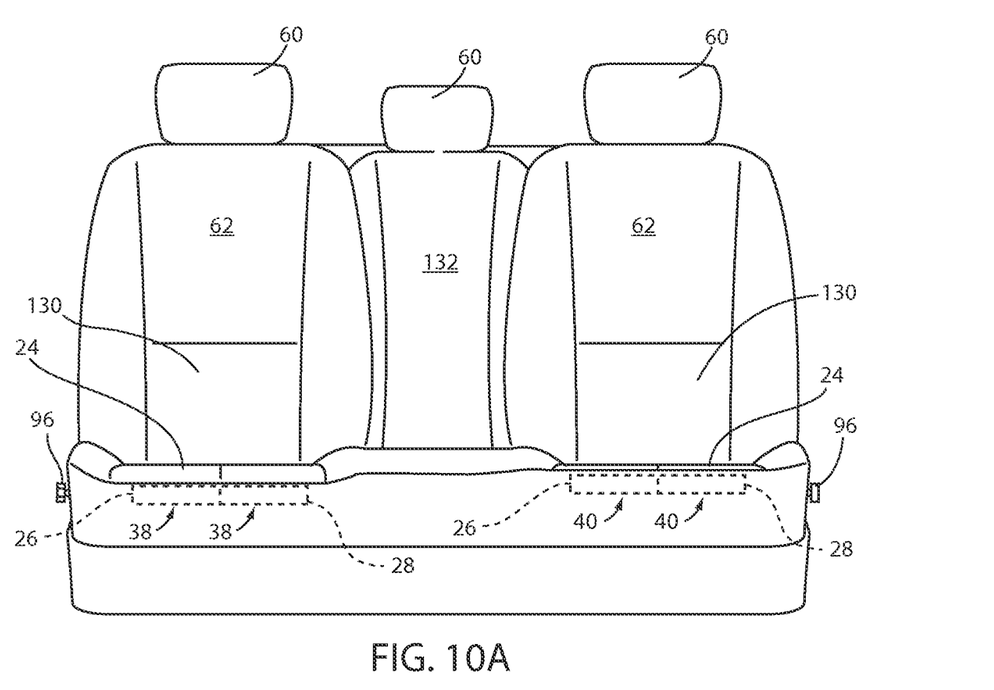
FIG. 10A is a front plan view of a vehicle seating assembly having the self-locking cam system according to one embodiment of the present invention.
Figure 10B:
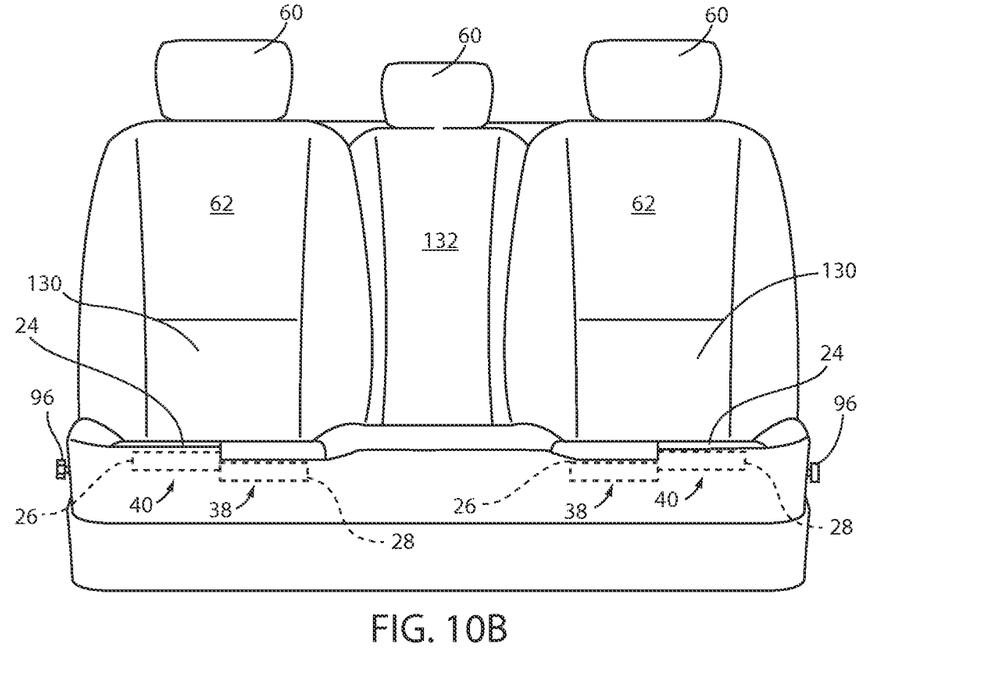
FIG. 10B is a front plan view of the vehicle seating assembly having the self-locking cam system according to one embodiment of the present invention.

Referring now to the embodiments illustrated in FIGS. 9A-10B, both the first and second thigh supports 26, 28 are configured to be in the lowered position 38 (see FIG. 9A) or the raised position 40 (see FIG. 9B). Additionally, each of the first and second thigh supports 26, 28 may be configured to move independently of each other such that the first thigh support 26 may be in a lowered position 38, while the second thigh support 28 is in the raised position 40 (see FIG. 9C), or the first thigh support 26 may be configured to be in the raised position 40, while the second thigh support 28 is configured to be in the lowered position 38 (see FIG. 9B). Moreover, the vehicle seating assembly 20 may be a seating assembly that includes three seating surfaces, specifically two side seats 130 and a center seat 132. As shown in the embodiments illustrated in FIGS. 10A-10B, the self-locking cam system 30 may be disposed in any of the side seats 130. However, it is also contemplated that the self-locking cam system 30 may be disposed in the center seat 132. If the self-locking cam system 30 is disposed in the center seat 132, the center seat 132 may be operably coupled with one of the self-locking cam system 30 in either of the side seats 130. Similar to the embodiment shown in FIGS. 9A-9B, the self-locking cam system 30 illustrated in FIGS. 10A and 10B may be configured to move in conjunction with one another such that both the first and second thigh supports 26, 28 are in the lowered position 38 or both the first and second thigh supports 26, 28 are in the raised position 40 (see FIG. 10A). It is also contemplated that the first and second thigh supports 26, 28 may be configured to move independently of each other such that the first thigh support 26 is in the raised position 40, while the second thigh support 28 is in the lowered position 38, and vice versa (see FIG. 10B).

Yet another aspect of the present invention is to provide increased support and comfort to a vehicle passenger who is seated in the vehicle seating assembly. Prior vehicle seating assemblies lack lower thigh support for the vehicle passenger seated on the vehicle seating assembly. Typical vehicle seating assemblies, and particularly rear vehicle seating assemblies, do not provide adequate cushion length and height that result in the vehicle passenger having no lower thigh support. Prior art thigh support systems include complex power seat mechanisms that may be difficult to include in some types of vehicle seating assemblies and particularly rear vehicle seating assemblies. The self-locking cam system of the present invention provides the ability of the vehicle passenger to raise the seat base to meet the lower thigh to provide additional support to the lower thigh. Moreover, the manual nature of the self-locking cam system of the present invention allows the vehicle passenger to adjust the vehicle seating assembly with or without vehicle power. The self-locking cam system of the present invention also eliminates the need for electronic components of prior art complex powered seat mechanisms. The present invention uses the actuation lever that is operably coupled to a torque tube. The torque tube extends the entire width of the seat base and includes multiple cams. The cams begin in a low position and are moved to a high position when the actuator lever is moved 180 degrees from the down position to an up position. The cam then comes into contact with a spring and a spring guide boss, which are disposed on a bottom surface of the first thigh support. The first thigh support then rotates about a hinge pin and is configured to raise a front portion of the seat base approximately 15-30 millimeters. The raising of the seat base provides the vehicle passenger with additional support and comfort to the lower thighs. Moreover, the seat base may include independent first and second thigh supports such that the vehicle passenger can independently move both of the first and second thigh supports to customizable positions, in order to provide additional comfort to the vehicle passenger.

It will also be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly comprising:
   a seatback;
   a seat base including a first thigh support and a second thigh support;
   a cam system operably coupled with the first thigh support and the second thigh support including a torque tube having a plurality of cams disposed along the torque tube wherein each thigh support is operably coupled with a plurality of spring guides that guide springs disposed between the cams and the thigh supports, and wherein each spring guide is disposed at least partially in a compression spring; and
   wherein the cam system is configured to move the first thigh support and the second thigh support from a lowered position to a raised position.

2. The vehicle seating assembly of claim 1, wherein the first and second thigh supports move from the lowered position to the raised position independently of each other.

3. The vehicle seating assembly of claim 1, wherein the cam system includes a first cam subassembly configured to move the first thigh support and a second cam subassembly configured to move the second thigh support.

4. The vehicle seating assembly of claim 1, wherein the first and second thigh supports rotate about a hinge pin disposed in the seat base.

5. The vehicle seating assembly of claim 1, wherein the cam system further includes a cam follower that surrounds and protects each of the cams during use.

6. The vehicle seating assembly of claim 1, wherein the torque tube is secured into the seat base using a plurality of pillow blocks.

7. A vehicle seating assembly, comprising:
   a seat base having first and second thigh supports, independently movable;
   a cam system including cams disposed along a torque tube and operably coupled with the first and second thigh supports;
   spring guides disposed in and aligned with compression springs that spring-bias the cams; and
   an actuation lever operably coupled with the cam system and configured to move the first and second thigh supports between lowered and raised positions.

8. The vehicle seating assembly of claim 7, wherein the actuation lever is configured to be in a down position corresponding with the first and second thigh supports being in the lowered position and an up position corresponding with the first and second thigh supports being in the raised position.

9. The vehicle seating assembly of claim 7, wherein the cam system includes a first cam subassembly configured to move the first thigh support and a second cam subassembly configured to move the second thigh support.

10. The vehicle seating assembly of claim 7, wherein the torque tube is secured into the seat base using a plurality of pillow blocks.

11. The vehicle seating assembly of claim 7, wherein the cam system is a spring-biased self-locking cam system.

12. A vehicle seating assembly comprising:
    a seat base having first and second thigh supports;
    first and second cam subassemblies operably coupled with the first and second thigh supports and including a plurality of spring-biased cams spaced apart along a torque tube, wherein the cams are biased by compression springs; and
    wherein the first and second cam subassemblies are configured to move the first and second thigh supports independently from a lowered position to a raised position using first and second actuation levers.

13. The vehicle seating assembly of claim 12, wherein the first and second thigh supports move from the lowered position to the raised position independently of each other.

14. The vehicle seating assembly of claim 12, wherein the actuation levers are configured to be in a down position corresponding with the first and second thigh supports being in the lowered position and an up position corresponding with the first and second thigh supports being in the raised position.

15. The vehicle seating assembly of claim 12, wherein the actuation levers are configured for manual adjustment by a user.

16. The vehicle seating assembly of claim 12, wherein the first and second thigh supports rotate about a hinge pin disposed in the seat base.

17. The vehicle seating assembly of claim 12, wherein the cam system is a self-locking cam system.

* * * * *